United States Patent [19]

Nakatani

[11] Patent Number: 5,718,544
[45] Date of Patent: Feb. 17, 1998

[54] METHOD FOR PRODUCING A TWO-PART MEMBER HAVING RACK TEETH

[75] Inventor: Koichiro Nakatani, Tokyo, Japan

[73] Assignee: Nihon Velbon Seiki Kogyo Kabushiki Kaisha, Tokyo, Japan

[21] Appl. No.: 500,897

[22] PCT Filed: Mar. 2, 1995

[86] PCT No.: PCT/JP95/00332

§ 371 Date: Jul. 26, 1995

§ 102(e) Date: Jul. 26, 1995

[51] Int. Cl.$^6$ ............................................. B23F 5/00
[52] U.S. Cl. ........................... 409/48; 29/893; 407/29; 409/38; 409/40; 409/50; 409/51; 409/55
[58] Field of Search ............................ 409/38, 40, 48, 409/61, 62, 51, 55, 217, 50; 407/20, 21, 29; 29/893

[56] References Cited

U.S. PATENT DOCUMENTS

| | | | |
|---|---|---|---|
| 3,230,830 | 1/1966 | Romi | 409/48 |
| 3,711,915 | 1/1973 | Maxon, Jr. et al. | 29/893 |
| 3,718,052 | 2/1973 | Barr et al. | 74/462 |
| 4,521,141 | 6/1985 | Abe | 490/38 |
| 4,588,336 | 5/1986 | Navarro | 409/48 |
| 4,598,451 | 7/1986 | Ohki | 29/893 |
| 5,628,222 | 5/1997 | Yasuda et al. | 72/192 |

FOREIGN PATENT DOCUMENTS

| | | |
|---|---|---|
| 54-84694 | 7/1979 | Japan. |
| 4159017 | 6/1992 | Japan. |

Primary Examiner—Daniel W. Howell
Assistant Examiner—Christopher Kirkman
Attorney, Agent, or Firm—Morrison Law Firm

[57] ABSTRACT

A base member such as an elevation pipe of a photographic tripod is severed and rack teeth are formed thereon in a single operation while the base member remains clamped in a V-block. The first rack tooth on each side of the location where the base member is severed includes half of a trough portion between adjacent rack teeth. Additional trough portions forming the remainder of the teeth are formed, either in the same severing and shaping operation, or in a later shaping operation. The formation of the inner half trough portions ensures that, when the two severed ends of the base member are brought together, a smooth transition will exist between the two rack portions. In addition, since the two severed ends always include half troughs immediately adjacent thereto, weaknesses and chipping resulting from the presence of partial rack teeth in these locations is avoided.

6 Claims, 6 Drawing Sheets

METHOD FOR PRODUCING A TWO-PART MEMBER HAVING RACK TEETH

BACKGROUND OF THE INVENTION

This invention relates to a method for producing a member which consists of two parts with rack teeth. The method cuts the rack teeth while dividing the entire rack into two parts.

As shown in FIG. 9, a photography tripod typically includes an elevation pipe 1 to attach to a camera platform (not shown) on which a camera is mounted. Rack teeth 2 in the surface of elevation pipe 1 engage a pinion 4. Leg pipes 5 are attached to elevation pipe 1 near its upper end. Leg pipes 5 can be spread apart and closed. Revolving pinion 4 moves elevation pipe 4 up or down to adjust the height of the camera installed on the tripod.

In order to permit a relatively large range of vertical movement of elevation pipe 1, elevation pipe 1 is made as long as possible. However, when elevation pipe 1 is moved downward and leg pipes 5 are widely spread to position the camera as low as possible, the end of a long elevation pipe 1 contacts the ground and limits the amount by which leg pipes 5 may be spread. One attempt to solve this problem includes dividing elevation pipe 1 into two parts and removing the lower part when taking a picture with leg pipes 5 widely spread.

With the two-part elevation pipe 1, it is difficult to coordinate the shapes and positions of the teeth of the upper and lower parts closely enough that, when pinion 4 crosses the junction between them, smooth motion results. Frequently, binding, or jerky motion occurs.

Therefore, precise cutting is required to shape rack teeth 2 on each divided part so that the undulations of the rack teeth 2 on the two parts correspond to each other when the parts are connected. The requirement for such precise cutting makes the two-part elevation pipe 1 unsuitable for mass production.

OBJECTS AND SUMMARY OF THE INVENTION

In order to solve the above problems, an object of the invention is to provide a method for processing a two-part rack member having rack teeth thereon. The method ensures that the undulations of the rack teeth on the two parts correspond to each other when the two parts are connected.

It is a further object of the invention to provide apparatus for severing a base member to form a two-part base member, and for form rack teeth in the separated parts of the two parts in which the portions of the base member adjacent the separation are half grooves so that the two parts fit together precisely to provide smooth operation, and resistance to chipping of the rack teeth nearest the separation.

It is a still further object of the invention to provide apparatus and method for cutting and shaping rack teeth on a plurality of base members aligned parallel to each other in a substantially continuous operation.

Briefly stated, the present invention provides apparatus and method for severing a base member such as an elevation pipe of a photographic tripod and forming rack teeth thereon in a single operation while the base member remains clamped in a V-block. The first rack tooth on each side of the location where the base member is severed includes half of a trough portion between adjacent rack teeth. Additional trough portions forming the remainder of the teeth are formed, either in the same severing and shaping operation, or in a later shaping operation. The formation of the inner half trough portions ensures that, when the two severed ends of the base member are brought together, a smooth transition will exist between the two rack portions. In addition, since the two severed ends always include half troughs immediately adjacent thereto, weaknesses and chipping resulting from the presence of partial rack teeth in these locations is avoided.

The invention comprises a rack member production method which arranges rotary shaping blades for forming rack teeth by cutting into the rack formation surface of respective base members for rack production, the rotary shaping blades being parallel to each other in a row in the longitudinal direction of the base members for rack production; maintaining the direction in which the rotary shaping blades are arranged parallel to the length of the base members for rack production; and forming numerous rack teeth on the rack formation surface of the respective base members for rack production by simultaneously cutting these base members for rack production with these rotary shaping blades; wherein the center of the trough of one of the rack teeth being formed on the rack formation surface of each base member for rack production is cut through by a rotary cutting blade simultaneously with formation of the rack teeth. Therefore, where the members are joined together, the rack teeth at the connecting point are connected to each other at their trough portions, with their undulations corresponding to each other. Since the troughs of both rack teeth are formed in half sections, the portion does not break so easily as a case where the top part is cut in half. Thus, according to the invention, it is easy to obtain a rack member divided in two parts of which the undulations of the rack teeth are certain to correspond to each other when the parts are joined together, with the strength of the rack teeth being maintained so that the rack teeth are free from the danger of breakage.

According to an embodiment of the invention, there is provided a method for producing a 2-part member having rack teeth comprising: clamping a base member in a V-block, the step of clamping including exposing a portion of the base member upon which the rack teeth are to be formed, forming a transverse groove in the V-block, forming, as an integral unit, a cutting and shaping assembly which includes a rotary cutting blade and at least a first rotary shaping blade on a first side of the rotary cutting blade, and a at least a second rotary shaping blade on a second side of the rotary cutting blade, the first rotary shaping blade adjacent the rotary cutting blade being shaped to form a first half of a trough portion between adjacent rack teeth, the second rotary shaping blade adjacent the rotary cutting blade being shaped to form a second half of a trough portion between adjacent rack teeth, whereby, when the first and second trough portions are abutted, a full trough portion between adjacent rack teeth is formed, engaging the base member with the rotary cutting blade, and moving the cutting and shaping assembly across the base member with the rotary cutting blade aligned with the transverse groove, continuing the step of engaging until the base member is severed into two separated pieces, and continuing the step of engaging while the at least a first rotary shaping blade and the at least a second shaping blade form the rack teeth in the portion.

According to a feature of the invention, there is provided apparatus for producing a 2-part member having rack teeth comprising: at least one V-block, means in the at least one V-block for clamping a base member, the at least one V-block including means for exposing a portion of the base member clamped therein upon which at least one of cutting and shaping operations is to be performed, a transverse groove in the V-block, a cutting and shaping assembly formed as an integral unit, the cutting and shaping assembly including a rotary cutting blade and at least a first rotary shaping blade on a first side of the rotary cutting blade, and a at least a second rotary shaping blade on a second side of the rotary cutting blade, the first rotary shaping blade adjacent the rotary cutting blade being shaped to form a first half of a trough portion between adjacent rack teeth, the second rotary shaping blade adjacent the rotary cutting blade being shaped to form a second half of a trough portion between adjacent rack teeth, whereby, when the first and second trough portions are abutted, a full trough portion between adjacent rack teeth is formed, the transverse groove being sized to permit the rotary cutting blade to pass therethrough, whereby the base member may be severed while being clamped in the V-block, the transverse groove being further sized to permit the first and second shaping blades to engage the base member, whereby the rack teeth are formed while the base member remains clamped in the V-block.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
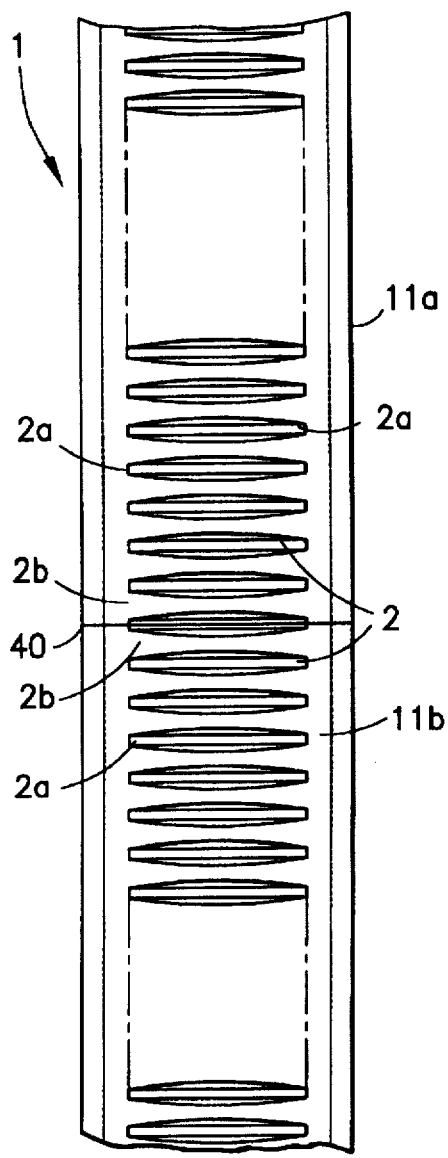
FIG. 1 is a front view of a two-part member having rack teeth which produced according to a method of the present invention.

A method of processing a two-part member having rack teeth according to an embodiment of the present invention is explained hereunder, referring to the drawings.

Referring to FIG. 1, a two-part elevation pipe 1 includes an upper pipe body 11a abutting a lower pipe body 11b at a junction 40. A rack is formed on the surface of upper pipe body 11a and lower pipe body 11b. A trough portion 2a is formed centered on junction 40. In this way, the two top portions 2a of the nearest rack teeth 2 are displaced from junction 40, and are not the portions of rack teeth 2 that sometimes occur if the separation forming junction 40 is performed after rack teeth 2 are performed.

Figure 2:
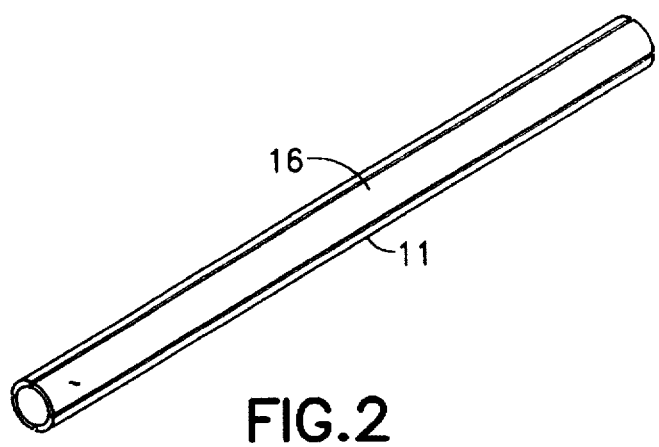
FIG. 2 is an oblique view of an embodiment of a base member for rack production used for the method of the invention.

Referring to FIG. 2, a pipe body 11 is a base member for rack production. Pipe body 11 is formed by any convenient technique such as, for example, by extrusion or extraction.

Figure 3:
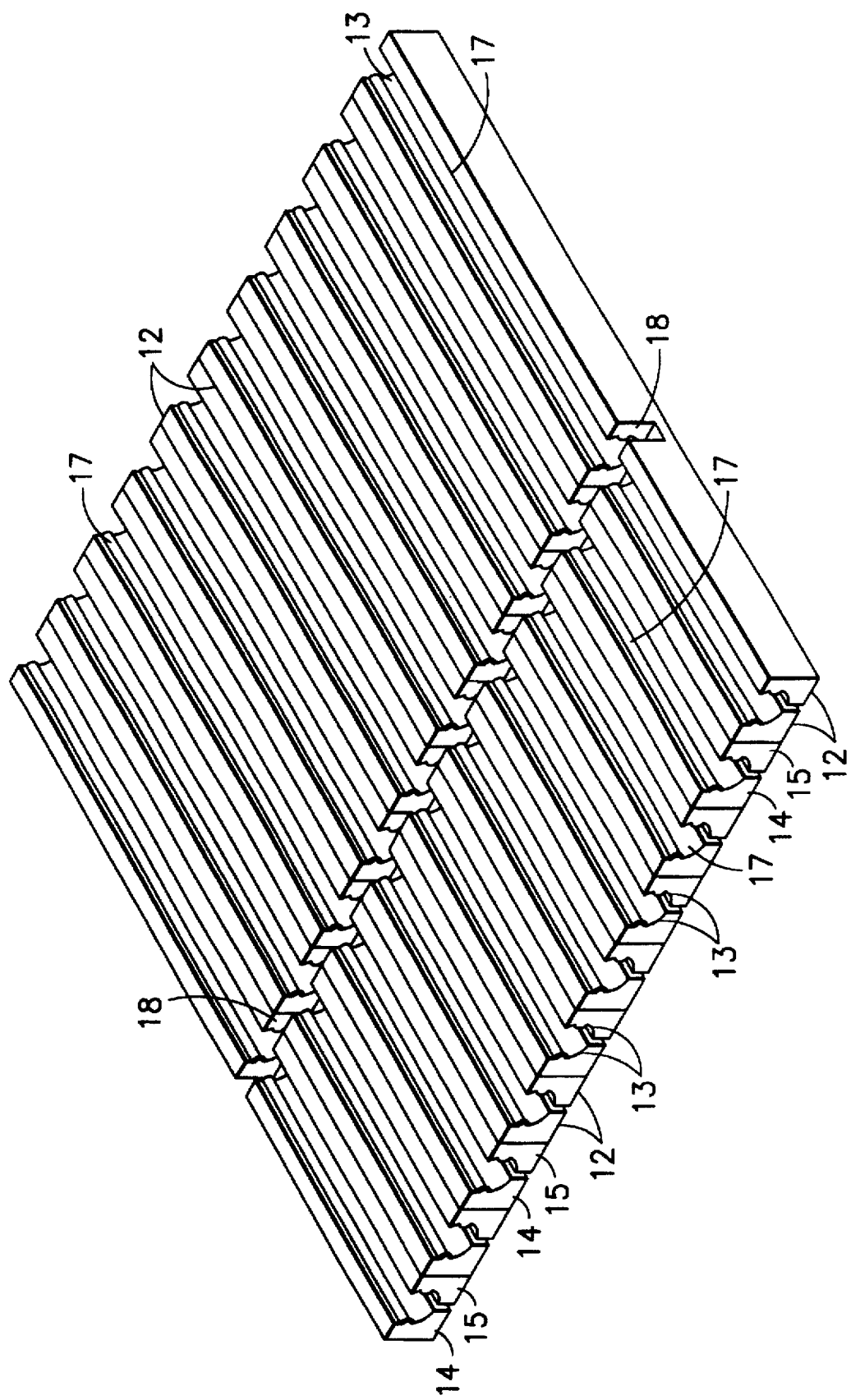
FIG. 3 is an oblique view of a V-block for holding the base member while cutting rack teeth into this member.

Referring now to FIG. 3, a plurality of V-blocks 12 are shown side by side. Each V-block 12 is divided longitudinally to form a pair of V-block bodies 14/15 for receiving a pipe body 11 (not shown in FIG. 3). When clamped to a pipe body, V-block bodies 14/15 form a concave arc-shaped support surface 13 whose shape fits tightly over the outer surface of pipe body 11. V-block bodies 14/15 leave an open space 17 to expose a rack formation surface 16 (FIG. 2) of pipe body 11.

A transverse groove 18 for cutting pipe body 11 into two parts is located in an intermediate location along V-block bodies 14/15.

Figure 4:
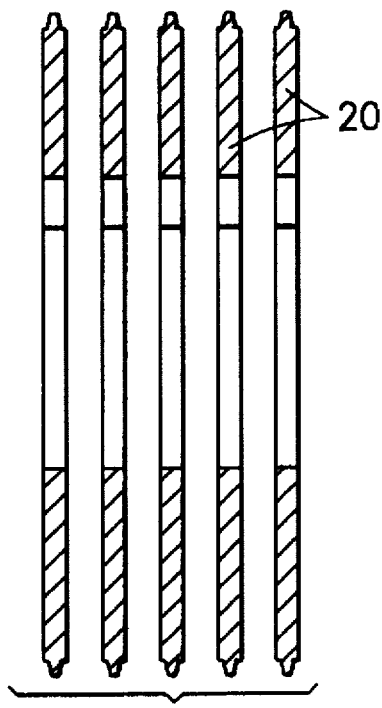
FIG. 4 is a sectional view of rotary shaping blades to which reference will be made in describing the method of the invention.

Referring now to FIG. 4, a plurality of disk-shaped rotary shaping blades 20 are stacked together parallel to each other to form rack teeth 2 by cutting rack formation surface 16 on pipe body 11. The number of rotary shaping blades 20 is equal to the number of grooves to be cut to rack teeth 2. Rotary shaping blades 20 are held together by any convenient means to assemble them into a single cutting element. For example, rotary shaping blades 20 may be assembled together using a plurality of bolts (not shown). The thus-assembled rotary cutting blades are then clamped in a suitable machine, such as a lathe or a shaper (not shown) for imparting the required motion thereto.

Figure 5:
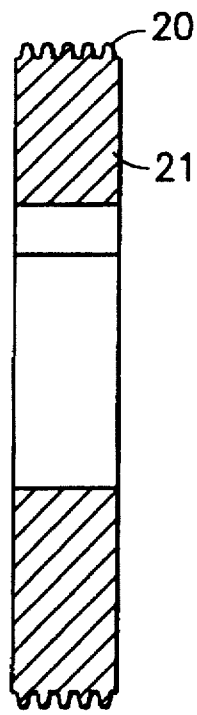
FIG. 5 is a sectional view of a rotary shaping blade according to another embodiment of the invention.

Referring now to FIG. 5, a further embodiment of the invention employs a plurality of rotary shaping blades 20 integrally formed parallel to each other in a block 21.

Figure 6:
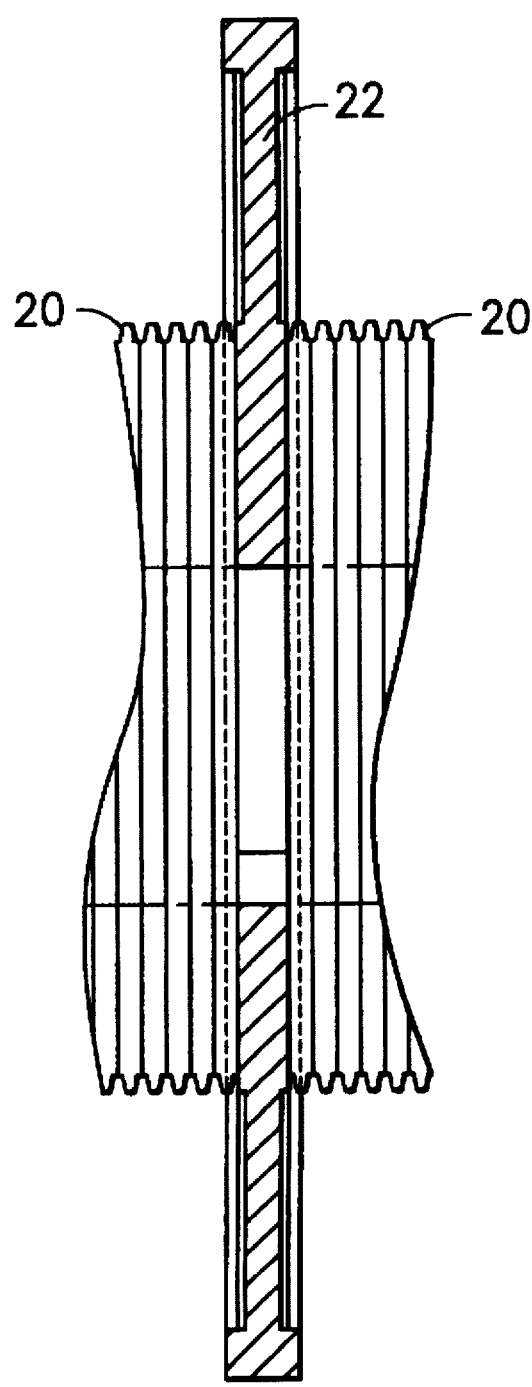
FIG. 6 is a sectional view of a cutting blade of the second embodiment.
Figure 7:
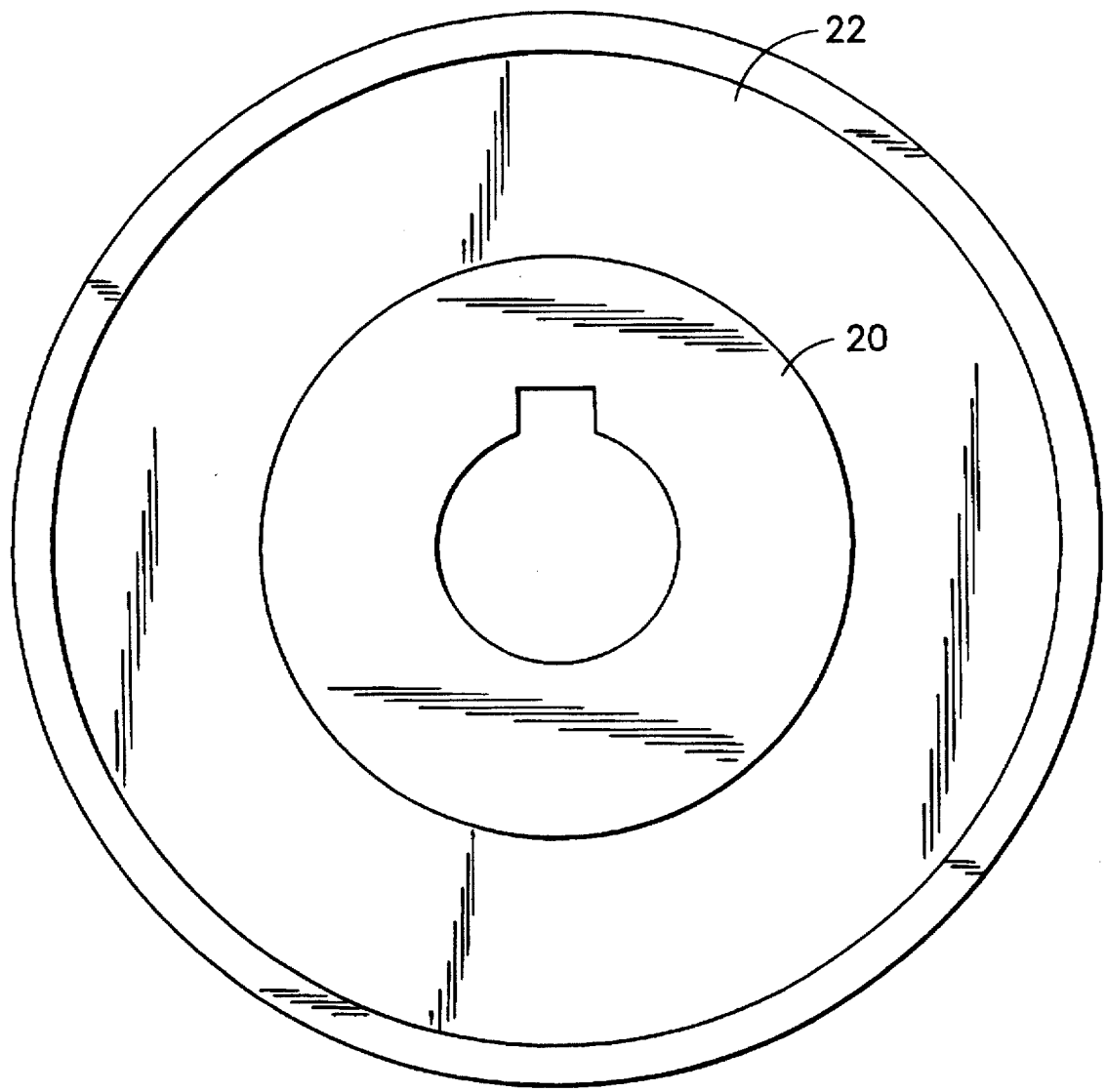
FIG. 7 is a front view of the cutting blade of FIG. 6.
Figure 9:
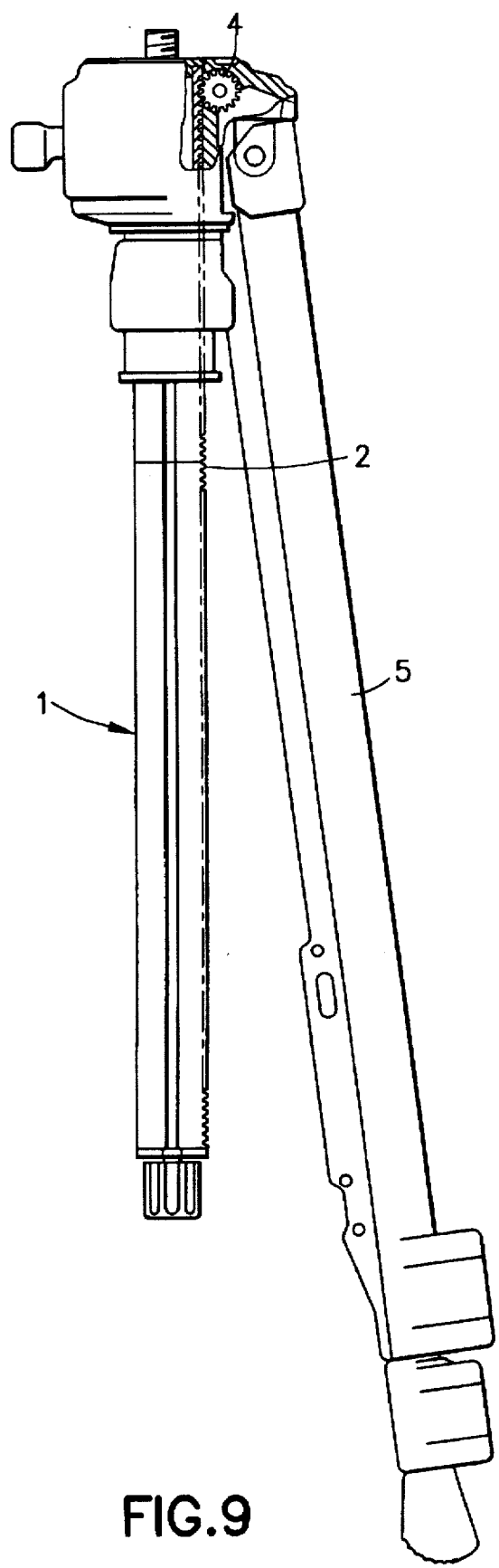
FIG. 9 is a partially cut out oblique view of a tripod.

Referring now to FIGS. 6 and 7 a disk-shaped rotary cutting blade 22 is sandwiched between parallel rotary shaping blades 20, and is thereby held at a specified cutting position with respect to rotary shaping blades 20. Rotary cutting blade 22 is coaxial with rotary shaping blades 20, with a diameter greater than that of rotary shaping blades 20. An outer surface of rotary cutting blade 22 has a conventional shape capable of cutting through rotary pipe 2. The width of cutting blade 22 is established so that after the cut, when the cut ends are fitted together, the junction is located in the center of a trough between adjacent rack teeth 2.

Next, the operation procedure of the above embodiment is explained hereunder.

First of all, the base member for rack production, i.e. pipe body 11, is placed snugly on support surface 13 defined by V-block bodies 14/15 of each V-block 12. V-block bodies 14/15 are clamped tightly together to secure pipe bodies 11 by tightly joining V-block bodies 14/15. Pipe bodies 11 are thus arrange parallel to each other in rows in V-blocks 12 with the rack formation surface 16 of each pipe body 11 exposed through open space 17.

Rotary shaping blades 20 and rotary cutting blade 22 are arranged as shown in FIG. 6. The assembly is engaged to cut rack teeth 2 at the same time that it severs pipe body 11. This cuts and shapes rack teeth 2 aligned parallel to each other, in a row along the length of pipe bodies 11. Due to the integral assembly of rotary shaping blades 20 and rotary cutting blade 22, the cut ends of pipe body 11 include precisely aligned rack teeth 2 adjacent their ends, thereby ensuring smooth and accurate engagement therewith.

In one embodiment of the invention, rotary cutting blade 22 extends radially far enough to complete the cutting of pipe body 11 before the shaping of rack teeth by rotary shaping blades is completed, or even begun. In this case, with pipe body 11, now partly or completely severed, rotary shaping blades 20 are moved using a horizontal milling machine while rotating rotary shaping blades 20, with the direction of rotation of rotary shaping blades 20 being parallel to the length of pipe bodies 11, so that numerous rack teeth 2 are simultaneously formed on rack formation surfaces 16 of pipe bodies 11 by rotary shaping blades 20. At the same time, rotary cutting blade 22 rotated together with rotary shaping blades 20 advances into cutting groove 18, which is shaped about the middle of V-block bodies 14/15 of each V-block 12, as it simultaneously cuts in half the center of trough portion 2a of one of rack teeth 2a being shaped on rack formation surface 16 of each pipe body 11.

Thus, rack teeth 2 are simultaneously shaped on pipe bodies 11 when pipe bodies 11 are divided. When separated parts 11a/11b of each pipe body are connected, their rack teeth 2 are joined at trough portion 2a so that the undulation of rack tooth 2 on one part exactly matches that on the other. Further, as the rack tooth 2 on each part is so shaped as to have the length of its trough 2a reduced in half, its strength is maintained, thereby preventing rack tooth 2 from chipping, compared with a case where top portion 2a is cut in half.

Figure 8:
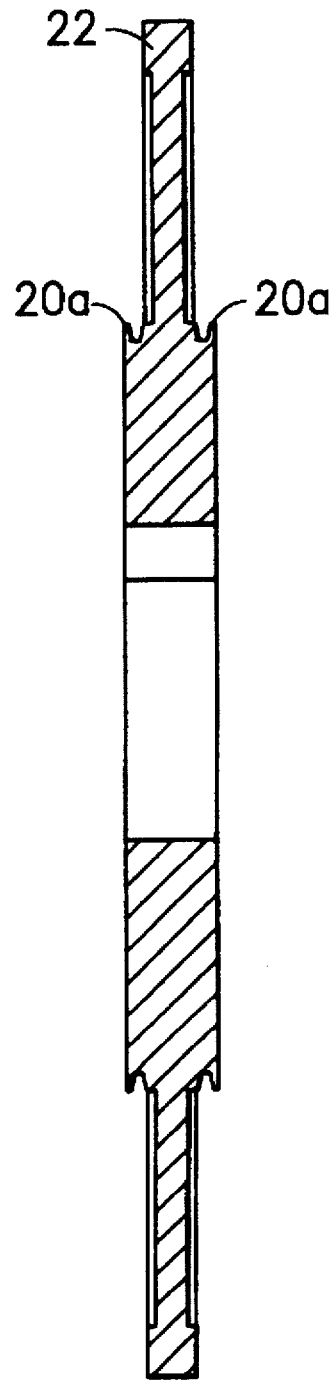
FIG. 8 is a sectional view of a cutting blade according to yet another embodiment.

Furthermore, as shown in FIG. 8, rotary cutting blade 22 may be integrally provided at each side with a blade portion 20a for forming a half of trough portion 2a of rack tooth 2. In this case, rotary shaping blades 20, too, include blades which are capable of forming a half trough portion 2a.

Although the invention is explained referring to the above embodiment, wherein the base member for rack production referred to in the appended claims is pipe body 11 which constitutes the elevation pipe of a tripod, the base member for rack production is not limited to a pipe or a tube but may be various kinds of a dividable rack member.

As described above, a method of producing a member which consists of two parts and has rack teeth according to the invention is applicable not only to a tubular member but also to any type of member to be formed into a dividable member having rack teeth.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

I claim:

1. A method for producing a two-part member having rack teeth comprising:

clamping a base member in a V-block;

the step of clamping including exposing a portion of said base member upon which said rack teeth are to be formed;

forming a transverse groove in said V-block;

forming, as an integral unit, a cutting and shaping assembly which includes a rotary cutting blade and at least a first rotary shaping blade on a first side of said rotary cutting blade, and at least a second rotary shaping blade on a second side of said rotary cutting blade;

said first rotary shaping blade adjacent said rotary cutting blade being shaped to form a first half of a trough portion between adjacent rack teeth;

said second rotary shaping blade adjacent said rotary cutting blade being shaped to form a second half of a trough portion between adjacent rack teeth, whereby, when said first and second trough portions are abutted, a full trough portion between adjacent rack teeth is formed;

engaging said base member with said rotary cutting blade, and moving said cutting and shaping assembly across said base member with said rotary cutting blade aligned with said transverse groove;

continuing the step of engaging until said base member is severed into two separated pieces; and continuing the step of engaging while said at least a first rotary shaping blade and said at least a second rotary shaping blade form said half trough portions in said base member.

2. A method according to claim 1, wherein:

the step of clamping includes clamping at least first and second base members in at least first and second V-blocks;

axes of said at least first and second base members being parallel to each other; and the step of forming a transverse groove includes forming a first transverse groove in said first V-block, and forming a second transverse groove in said second V-block; and aligning said first transverse groove and said second transverse groove with each other during the step of clamping, whereby said cutting and shaping assembly is enabled to cut and shape said first and second base members in a substantially continuous operation.

3. A method according to claim 1, wherein:

said at least a first rotary shaping blade includes a first plurality of rotary shaping blades;

all of said first plurality of rotary shaping blades, except said first rotary shaping blade adjacent said rotary cutting blade being shaped to form a complete trough;

said at least a second rotary shaping blade includes a second plurality of rotary shaping blades; and all of said second plurality of rotary shaping blades, except said second rotary shaping blade adjacent said rotary cutting blade being shaped to form a complete trough.

4. Apparatus for producing a two-part member having rack teeth comprising:

at least one V-block;

means in said at least one V-block for clamping a base member;

said at least one V-block including means for exposing a portion of said base member clamped therein upon which at least one of cutting and shaping operations is to be performed;

a transverse groove in said V-block;

a cutting and shaping assembly formed as an integral unit;

said cutting and shaping assembly including a rotary cutting blade and at least a first rotary shaping blade on a first side of said rotary cutting blade, and a at least a second rotary shaping blade on a second side of said rotary cutting blade;

said first rotary shaping blade adjacent said rotary cutting blade being shaped to form a first half of a trough portion between adjacent rack teeth;

said second rotary shaping blade adjacent said rotary cutting blade being shaped to form a second half of a trough portion between adjacent rack teeth, whereby, when said first and second trough portions are abutted, a full trough portion between adjacent rack teeth is formed;

said transverse groove being sized to permit said rotary cutting blade to pass therethrough, whereby said base member may be severed while being clamped in said V-block; and said transverse groove being further sized to permit said first and second shaping blades to engage said base member, whereby said rack teeth are formed while said base member remains clamped in said V-block.

5. Apparatus according to claim 4, wherein:

said at least one V-block includes at least first and second V-blocks;

said first V-block includes a first transverse groove, and said second V-block includes a second transverse groove; and means for permitting alignment of said first and second transverse grooves during clamping, whereby said first and second base members may be severed, and rack teeth formed thereon in a substantially continuous operation.

6. Apparatus according to claim 4, wherein:

said at least a first rotary shaping blade includes a first plurality of rotary shaping blades;

all of said first plurality of shaping blades, except said first rotary shaping blade adjacent said rotary cutting blade being shaped to form a complete rack tooth;

said at least a second rotary shaping blade includes a second plurality of rotary shaping blades; and all of said second plurality of shaping blades, except said second rotary shaping blade adjacent said rotary cutting blade, being shaped to form a complete rack tooth.

* * * * *